(12) United States Patent
Duchateau et al.

(10) Patent No.: US 9,512,268 B2
(45) Date of Patent: Dec. 6, 2016

(54) PROCESS FOR PREPARING A COPOLYMER

(71) Applicant: Saudi Basic Industries Corporation, Riyadh (SA)

(72) Inventors: Robbert Duchateau, Geleen (NL); Mark Petrus Franciscus Pepels, Eindhoven (NL)

(73) Assignee: SAUDI BASIC INDUSTRIES CORPORATION, Riyadh (SA)

( * ) Notice: Subject to any disclaimer, the term of this patent is extended or adjusted under 35 U.S.C. 154(b) by 0 days.

(21) Appl. No.: 14/766,254

(22) PCT Filed: Mar. 17, 2014

(86) PCT No.: PCT/IB2014/059897
§ 371 (c)(1),
(2) Date: Aug. 6, 2015

(87) PCT Pub. No.: WO2014/147546
PCT Pub. Date: Sep. 25, 2014

(65) Prior Publication Data
US 2015/0376330 A1    Dec. 31, 2015

(30) Foreign Application Priority Data

Mar. 18, 2013 (EP) ..................... 13001358

(51) Int. Cl.
| | | |
|---|---|---|
| *C08G 63/84* | (2006.01) | |
| *C08G 63/08* | (2006.01) | |
| *C08L 67/04* | (2006.01) | |
| *C08L 67/00* | (2006.01) | |
| *C08L 77/00* | (2006.01) | |
| *C08L 23/00* | (2006.01) | |
| *C08G 63/82* | (2006.01) | |

(52) U.S. Cl.
CPC .............. *C08G 63/84* (2013.01); *C08G 63/08* (2013.01); *C08G 63/823* (2013.01); *C08L 67/04* (2013.01)

(58) Field of Classification Search
CPC .... C08G 63/08; C08G 63/84; C08G 63/823; C08L 23/00; C08L 67/04; C08L 77/00
USPC .................. 528/356, 357; 525/186, 418, 420
See application file for complete search history.

(56) References Cited

U.S. PATENT DOCUMENTS

| | | | |
|---|---|---|---|
| 6,486,296 B1 | 11/2002 | Shimamoto et al. | |
| 8,901,253 B2 | 12/2014 | Behl et al. | |
| 8,933,190 B2 * | 1/2015 | van der Meulen | .... C08G 63/00 528/354 |
| 2009/0124787 A1 * | 5/2009 | Preishuber-Pflugl | C08G 63/823 528/355 |
| 2009/0187001 A1 | 7/2009 | Pawlow et al. | |
| 2012/0108784 A1 | 5/2012 | Clauss et al. | |
| 2015/0018497 A1 | 1/2015 | Farrugia et al. | |

FOREIGN PATENT DOCUMENTS

| | | |
|---|---|---|
| CN | 102617369 A | 8/2012 |
| DE | 2535562 A1 | 2/1977 |
| EP | 0686656 A2 | 12/1995 |
| WO | 2004081020 A1 | 9/2004 |
| WO | 2010110460 A1 | 9/2010 |
| WO | 2012065711 A1 | 5/2012 |

OTHER PUBLICATIONS

Kumar et al, "Efficient Ring-Opening Polymerization and Copolymerization of epsilon-Caprolactone and omega-Pentadecalactone Catalyzed by Candida antartica Lipase B," Macromolecules 2000, 33, 6303-6309.*
Bouyahyi, Miloud, "[omega]-Pentandecalactone Polymerization and [omega]-Pentadecalactone/[epsilon]-Caprolactone Copolymerization Reactions Using Organic Catalysts", Macormolecules, 45, 3356-3366 (2012).
Transmittal and International Search Report for PCTIB2014/059897 mailed Jul. 16, 2014, 5 pages.
Uyama H., et al., "Lipase-catalyzed ring-opening polymerization and copolymerization of 15-pentadecanolide", Acta Polymer, 47, 357-360 (1996).
Written Opinion of the ISA for PCT/IB2014/059897, mailed Jul. 16, 2014, 6 pages.
Cameron et al. "Pendant arm Schiff base complexes of aluminum as ethylene polymerization catalysts", Chem. Commun. 18 (1999), pp. 1883-1884.
Cameron et al. "Synthesis and characterization of neutral and cationic alkyl aluminum complexes bearing N,O-Schiff base chelates with pendant donor arms", J. Chem. Soc., Dalton Trans. (2002), pp. 415-422.
Chen et al. "Ring-Opening Polymerization of Lactides Initiated by Zinc Alkoxides Derived from NNO-Tridentate Ligands", Macromolecules, 39 (2006), pp. 3745-3752.
Darensbourg et al. "Ring-opening polymerization of cyclic monomers by biocompatible metal complexes. Production of poly(lactide), polycarbonates, and their copolymers", Macromolecules 40 (2007), pp. 3521-3523.
Extended EP Search Report for European Application No. 13173039.2, Nov. 15, 2013, 6 pages.

(Continued)

*Primary Examiner* — Fred M Teskin
(74) *Attorney, Agent, or Firm* — Cantor Colburn LLP

(57) ABSTRACT

A process for preparing a copolymer comprising subjecting a first cyclic ester having a ring size from 4 to 11 atoms and a second cyclic ester having a ring size from 12 to 40 atoms to ring-opening copolymerization using as catalyst a compound of formula I, wherein M is trivalent Al, Ti, V, Cr, Mn, Co, yttrium, Sc or lanthanides; X and X' are both a heteroatom; Y and Y' are O, N, S or P; Z is a substituent as described herein; L1 is an organic moiety linking X and Y; L2 is an organic moiety linking X' and Y'; L3 is an organic moiety linking Y and Y' and has a chain length between Y and Y' of at least 2 atoms. The copolymer has a randomness of at least 0.5 and a number average molecular weight of at least 15000 g/mol.

20 Claims, 4 Drawing Sheets

(56) References Cited

OTHER PUBLICATIONS

Extended European Search Report for European Application No. 13002690.9, Feb. 17, 2014, 7 pages.
Fokou et al. "Studying and Suppressing Olefin Isomerization Side Reactions During Admet Polymerizations", Macromolecular Rapid Commun. 31 (2010), pp. 368-373.
Hunsicker et al. "Synthesis of High Molecular Weight Polyesters via In Vacuo Dehydrogenation Polymerization of Diols", Rapid Commun. 33 (2012), pp. 232-236.
International Search Report for International Application No. PCT/IB2014/064260; International Filing Date Jun. 20, 2014; Date of Mailing Sep. 25, 2014; 4 pages.
International Search Report of the International Searching Authority for International Application No. PCT/IB2014/061561; International Filing Date May 20, 2014; Date of Mailing Sep. 5, 2014; 5 pages.
International Search Report of the International Searching Authority for International Application No. PCT/IB2014/061566; International Filing Date May 20, 2014; Date of Mailing Sep. 1, 2014; 5 pages.
Liu et al. "Polymers from Fatty Acids: Poly(ω-hydroxyl tetradecanoic acid). Synthesis and Physico-Mechanical Studies", Biomacromolecules, 12 (2011), pp. 3291-3298.
Stempfle et al. "Long-Chain Linear C19 and C23 Monomers and Polycondensates from Unsaturated Fatty Acid Esters", Macromolecules, 44 (2011), pp. 4159-4166.
Stempfle et al. "Which Polyesters Can Mimic Polyethylene?", Macromolecular Rapid Communications, 34 (2013), pp. 47-50.
Trosch et al. "Zinc complexes of a new N,N,O Ligand", Anorg. Allg. Chem. 630 (2004), pp. 2031-2034 (with English abstract).
Trzaskowski et al. "Aliphatic Long-Chain C20 Polyesters from Olefin Metathesis", Rapid Commun. 32 (2011), pp. 1352-1356.
van der Meulen et al. "Catalytic Ring-Opening Polymerisation of Renewable Macrolactones to High Molecular Weight Polyethylene-like Polymers", Macromolecules, 44 (2011), pp. 4301-4305.
Written Opinion of the International Searching Authority for International Application No. PCT/IB2014/061561; International Filing Date May 20, 2014; Date of Mailing Sep. 5, 2014; 7 pages.
Written Opinion of the International Searching Authority for International Application No. PCT/IB2014/061566; International Filing Date May 20, 2014; Date of Mailing Sep. 1, 2014; 6 pages.
Written Opinion of the International Searching Authority for International Application No. PCT/IB2014/062460; International Filing Date Jun. 20, 2014; Date of Mailing Sep. 25, 2014; 6 pages.
Yao et al. "Ring Opening polymerization of L-lactide by an electron-rich Schiff base zinc complex: An activity and kinetic study", Journal of Molecular Catalysis A: Chemical 352 (2012), pp. 57-62.
De Geus, Matthijs, et al., "Performance polymers from renewable monomers: high molecular weight poly (pentadecalactone) for fiber applications", Polym. Chem., 1, 525-533 (2010).
Duda, Andrzej, et al., "Kinetics of the Ring-Opening Polymerization of 6-, 7-, 9-, 12-, 13-, 16-, and 17-Membered Lactones. Comparison of Chemical and Enzymatic Polymerizations", Macromolecules, 35, 4266-4270 (2002).
Focarete, Maria Letizia, et al., "Physical Characterization of Poly(v-pentadecalactone) Synthesized by Lipase-Catalyzed Ring-Opening Polymerization", Journal of Polymer Science: Part B: Polymer Physics, vol. 39, 1721-1729 (2012).
Transmittal and International Preliminary Report on Patentability (IPRP) for PCT/IB2014/059897 mailed Oct. 1, 2015, 7 pages.
Zhong, Z., et al., "Controlled ring-opening polymerization of x-pentadecalactone with yttrium isopropoxide as an initiator", Macromol. Chem. Phys. 201, 1329-1333 (2000).

\* cited by examiner

PROCESS FOR PREPARING A COPOLYMER

This application is a national stage application of PCT/IB2014/059897, filed Mar. 17, 2014, which claims priority to European Patent Application Number 13001358.4, filed Mar. 18, 2013, which are hereby incorporated by reference in their entirety.

The present invention relates to a process for preparing a copolymer of a first cyclic ester having a first ring size from 4 to 11 atoms and a second cyclic ester having a second ring size from 12 to 40 atoms. The present invention further relates to a copolymer and to a polymer composition.

Polyesters are interesting materials because of the properties that these materials can exhibit. These properties, for instance, include biocompatibility, biodegradability, and drug permeability. In addition they may exhibit preferred barrier properties when used in film applications. Therefore, polyesters are of great interest for medical and food packaging applications. For these purposes materials with an engineered structure are desired, which implies the need for a high level of control over the polymerization reaction. In addition, with the right properties, certain polyesters can form an interesting biodegradable alternative for polyethylene in various applications. Traditional polyester synthesis strategies, using e.g., polycondensation, give rise to fundamental problems that can make the controlled synthesis of these materials a tedious process.

For example, the preparation of polyesters by polycondensation can be accompanied by stoichiometric problems, the need for high conversion to obtain appreciable molecular weights and the removal of small molecules formed during the reaction. A suitable replacement for these conventional strategies is the ring-opening polymerization of lactones, which are cyclic esters. This type of polymerization is based on the ring-opening of cyclic monomers and the formation of a polymer chain by means of a chain-growth process.

It is known that ring-opening polymerization reactions of lactones, which are cyclic esters, can be performed with enzymes with satisfactory conversion under mild polymerization conditions. For example, lipases such as *Candida Antarctica* Lipase B (CALB) are highly active in the ring-opening polymerization of lactones and show exceptionally high polymerization rates for lactones having a large ring size, sometimes referred to as macrolactones. The reactivity of lactones in this process is not governed by the high ring-strain of small ring size lactones (cisoid ester bonds) but by the preference of the lipase for transoid ester bond conformation present in large ring lactones. Macrolactones can thus easily be polymerized by CALB. For example, poly(pentadecalactone) with a number average molecular weight up to 150000 g/mol have been reported (Focarete et al., J. Polym. Sci. B: Polym. Phys. 2001, 39, 1721 and De Geus et al., Polym. Chem. 2010, 1, 525). However, control over molecular weight and polydispersity index (in particular a polydispersity index of ~2) of the resulting polyester is limited. Moreover, ring-opening polymerization with enzymes is strongly limited by the applied temperature, because enzymes will typically not withstand higher reaction temperatures. In addition, the enzymes that can be used for ring-opening polymerization of lactones are rather expensive.

In view of the limitations of enzymatic ring-opening polymerization, attempts have been made to find suitable alternative metal-mediated ring-opening polymerization processes. Such processes are particularly attractive, because they allow a high level of control over the polymer molecular weight, the molecular weight distribution, copolymer composition and topology and end-groups by using a nucleophilic initiator. It is commonly agreed that the driving force behind the ring-opening polymerization of lactones is the release of ring-strain in the transition from the cyclic ester to the polyester chain or, in thermodynamic terms, by the negative change of enthalpy. Consequently, as the ring-strain decreases with increasing lactone size so does the reactivity in metal-mediated ring-opening polymerization. Experimentally, this was shown by Duda in a comparative study of the ring-opening polymerization of various size lactones using zinc octanoate/butyl alcohol as a catalyst/initiator (Duda et al., Macromolecules 2002, 35, 4266). While the relative rates of polymerization were found to be 2500 and 330 for the six-membered ($\delta$-valerolactone) and seven-membered ($\epsilon$-caprolactone)

lactones, respectively, the reaction rates of the 12-17 membered lactones were only around 1. Consequently, only a few examples of metal-catalyzed ring-opening polymerization of macrolactones like 15-pentadecalactone can be found in literature, while those examples that can be found only report relatively low yields and relatively low molecular weights. The best results were obtained using yttrium tris (isopropoxide) leading to acceptable conversions and molecular weights of up to an absolute number average molecular weight of 30 000 g/mol (Zhong et al., Macromol. Chem. Phys. 2000, 201, 1329).

The copolymerisation of cyclic esters having a small ring size is known for example from WO 2010/110460, which discloses a method for producing a lactide/$\epsilon$-caprolactone copolymer whereby a lactide/$\epsilon$-caprolactone copolymer being close to an ideal random copolymer can be produced while controlling the molecular weight and the molecular weight distribution. The copolymerisation method disclosed in WO 2010/110460 was carried out using an aluminium-salen complex as a catalyst.

Copolymers of $\omega$-pentadecalactone and $\epsilon$-caprolactone, i.e. a copolymer of a small ring size lactone and a large ring size lactone has been disclosed by Bouyahyi et al (Bouyahyi, M. et al., Macromolecules 2012, 45, 3356-3366). This article discloses that 1,5,7-triazabicyclo[4.4.0]dec-5-ene (TBD) in combination with benzyl alcohol (BnOH) as initiator is an active catalyst for the copolymerisation of $\omega$-pentadecalactone and $\epsilon$-caprolactone. As a result of rapid competitive intra- and intermolecular transesterification only random copolymers were obtained. A disadvantage of the method disclosed by Bouyahyi et al. is that it requires the use of an organic catalyst which do not allow high polymerisation rates and high polymer molecular weights.

H. Uyama et al (Acta Polymer., 47, 357-360) discloses an enzymatic ring-opening polymerization of 15-pentadecanolide (PDL) in bulk using various lipases of different origin as catalyst. This reference further discloses a copolymerization of PDL with $\epsilon$-caprolactone ($\epsilon$-CL or eCL). NMR data on these copolymers indicate that the copolymers are not statistically random.

WO 2012/065711 discloses a process for preparing a polyester, comprising providing an optionally substituted lactone having a ring size of from 6 to 40 carbon atoms; and subjecting said lactone to metal mediated ring-opening polymerization using as catalyst a compound according to general formula (I):

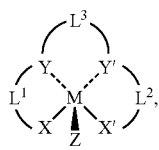

wherein

M is selected from the group consisting of Al, Ti, V, Cr, Mn and Co;

X and X' are independently a heteroatom, preferably X and X' are identical;

Y and Y' are independently selected from the group consisting of O, N, S, P, C, Si, and B, preferably Y and Y' are identical;

Z is selected from the group consisting of hydrogen, borohydrides, aluminium hydrides, carbyls, silyls, hydroxide, alkoxides, aryloxides, carboxylates, carbonates, carbamates, amines, thiolates, phosphides, and halides;

L1 and L2 are independently an organic ligand linking X and Y together and linking X' and Y' together, respectively, preferably L1 and L2 are identical; and L3 is an optional organic ligand linking Y and Y' together.

According to WO 2012/065711 the optional group L3 is preferably a straight or branched aliphatic chain, or cyclic or aromatic moiety, that contains 2 to 30 carbon atoms, optionally containing 1 to 10 heteroatoms selected from N, O, F, Cl and Br. More preferably, L3 is selected from the group consisting of —(CH$_2$)$_2$—, 1,2-phenyl, and 1,2-cyclohexyl. WO 2012/065711 is silent with respect to the copolymerisation of small ring lactones and large ring lactones.

SUMMARY

A process for preparing a random copolymer of cyclic esters having a small ring size and cyclic esters having a large ring size is described herein.

Also described is a process for preparing a random copolymer of cyclic ester having a small ring size and cyclic ester having a large ring size, which random copolymers have a high molecular weight.

Still further, a process for preparing a random copolymer of cyclic ester having a small ring size and cyclic ester having a large ring size, which process is commercially viable in terms of cost and yield is described.

These processes relate in particular to lactones.

Accordingly, a process for preparing a copolymer comprises providing a first cyclic ester having a first ring size from 4 to 11 atoms and a second cyclic ester having a second ring size from 12 to 40 atoms and subjecting the first and second cyclic ester to ring-opening copolymerization using as catalyst a compound of formula I formula I

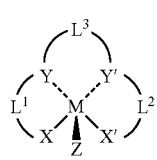

wherein

M is a trivalent metal selected from the group consisting of aluminium, titanium, vanadium, chromium, manganese, cobalt, yttrium, scandium and lanthanides;

X and X' are both a heteroatom and may be the same or different;

Y and Y' are independently selected from the group consisting of O, N, S, and P;

Z is selected from the group consisting of hydrogen, borohydrides, aluminium hydrides, carbyls, silyls, hydroxides, alkoxides, aryloxides, carboxylates, thiocarboxylates, dithiocarboxylates, carbonates, carbamates, guanidates, amides, thiolates, phosphides, hydrazonate, imide, cyanide, cyanate, thiocyanate, azide, nitro, siloxides and halides;

L1 is an organic moiety linking X and Y;

L2 is an organic moiety linking X' and Y';

L1 and L2 may be the same or different;

L3 is an organic moiety linking Y and Y' and has a chain length of at least 2 atoms.

The references "Y" and "Y'" in the Formula I above should not be confused with the abbreviation of the metal yttrium, which is commonly abbreviated "Y". In order to avoid confusion, the metal yttrium will be referred to herein only as "yttrium".

DETAILED DESCRIPTION

Figure 1:
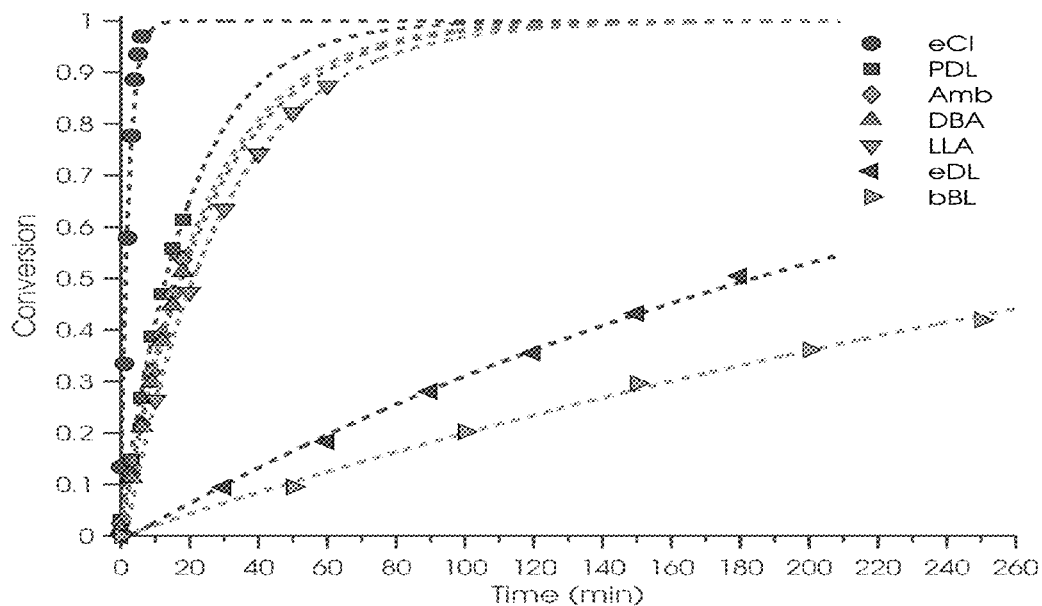
FIG. 1 is a graph showing the conversion as a function of time for the homopolymerisation of certain cyclic esters using Catalyst 1.

The present inventors surprisingly found that the process of the present invention results in the formation of random copolymers even though the (homo)polymerisation rates of the individual cyclic esters may differ.

The present inventors believe, without willing to be strictly bound by theory, that the catalyst as used in the process of the present invention allows not only a relatively fast rate of polymerisation of the cyclic esters but also a fast rate of transesterification, resulting in random copolymers rather than block copolymers.

Therefore, by employing the process described herein, at least part of the aforementioned advantages are met.

With respect to group Z:

the borohydride may be $BH_{4-x}R_x$ wherein x is an integer from 0-3 and R is carbyl or alkoxide, the aluminium hydrides may be $AlH_{4-x}R_x$, wherein x is an integer from 0-3 and R is carbyl or alkoxide, the carbyl may be any hydrocarbon, —CR$_3$, —Ar (aryl), —CR=CR$_2$, —C≡CR, wherein R is hydrogen, optionally substituted alkyl, optionally substituted aryl, the silyl may be —SiR$_3$, wherein R is hydrogen, optionally substituted alkyl, optionally substituted aryl, the alkoxide may be —OR, wherein R is optionally substituted alkyl, the carboxylate may be —OC(=O)R, wherein R is hydrogen, optionally substituted alkyl, optionally substituted aryl), the thiocarboxylate may be —SC(=O)R, wherein R is hydrogen, optionally substituted alkyl, optionally substituted aryl, the dithiocarboxylate may be —SC(=S)R, wherein R is hydrogen, optionally substituted alkyl, optionally substituted aryl, the guanidinate may be (—N=C(R$^a$)N(R$^b$)R$^c$ or N(R$^b$)C(R$^a$)=NR$^c$, wherein R$_a$, R$^b$, R$^c$ is hydrogen, optionally substituted alkyl, optionally substituted aryl, the carbonate may be —OC(=O)OR, wherein R is optionally substituted alkyl, optionally substituted aryl, the carbamate may be —OC(=O)NR$_2$, wherein R is optionally substituted alkyl, optionally substituted aryl, the amide may be —NR$_2$, wherein R is hydrogen, optionally substituted alkyl, optionally substituted aryl, the thiolate may be —SR, wherein R is hydrogen, optionally substituted alkyl, optionally substituted aryl, the phosphide may be —PR$_2$, wherein R is hydrogen, optionally substituted alkyl, optionally substituted aryl, the hydrazonate may be (—N(R$^a$)N=C(R$^b$)R$^c$, where R$^a$, R$^b$, R$^c$ is hydrogen, optionally substituted alkyl, optionally substituted aryl, the imide may be (—N=C(R$^a$)R$^b$, where R$^a$, R$^b$ is hydrogen, optionally substituted alkyl, optionally substituted aryl.

The term "carbyl" as used herein is meant to refer to all types of hydrocarbons including alkyl, aryl, vinyl and acetylene.

In a preferred embodiment, the L3 organic moiety has a chain length of at least 3 atoms and preferably at most 5 atoms. The present inventors surprisingly found that if the organic moiety L3 has a length of at least three atoms between the Y and Y' groups that the polymerisation rate of small ring size lactones increases substantially when compared to organic moiety L3 having a length of less than 3 atoms, resulting in a higher overall polymerisation rate yet without influencing the randomness of the obtained copolymer.

The metal M is preferably a trivalent metal selected from the group consisting of aluminium (Al), yttrium, scandium, and lanthanides. More preferably the metal M is aluminium.

In the compound according to general formula (I) it is preferred that X and X' are identical.

In the compound according to general formula (I) it is preferred that Y and Y' are identical.

In the compound according to general formula (I) it is preferred that L1 and L2 are identical.

Substituent Z can inter alia be a borohydride or an aluminium hydride. Borohydrides (e.g., BH$_4$) and aluminium hydrides (e.g., AlH$_4$) are anionic species that bind via the hydrides. This may be illustrated as M(μ-H)$_2$AH2 (M=as defined above, A=B or Al).

Preferably Z is a carbyl group having 1-4 carbon atoms, such as ethyl or methyl, or Z is an alkoxide group containing 1-20 carbon atoms, such as methoxide, ethoxide, or benzyloxide.

If Z is a carbyl group having 1-4 carbon atoms then in use when activating the catalyst with for example an alcohol, the respective organic molecule is released from the reaction mixture in gaseous form leaving no residues. For example, if Z is ethyl, then upon activation of the catalyst ethane is released.

The linking moieties L1, L2 and L3 together with X, X', Y and Y' form a tetradentate ligand bound to metal M. This tetradentate ligand is preferably selected from porphyrins, salen and Schiff-bases, more preferably the tetradentate ligand is a salen.

Preferably X and/or X' are oxygen (O) and more preferably X and X' are identical. Preferably Y and/or Y' are nitrogen (N) and more preferably Y and Y' are identical.

In a preferred embodiment the catalyst is a compound of formula II

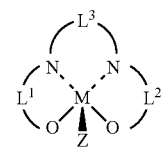

formula II wherein M, Z, L1, L2, and L3 are the same as defined above.

L1 and L2 are preferably selected from the following list of organic moieties:

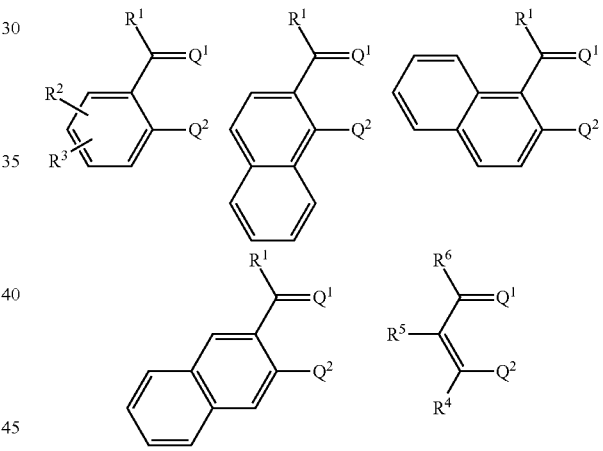

wherein:
Q1 and Q2 are Y and X respectively or Y' and X' respectively;

R$^1$ is selected from the group consisting of hydrogen, C$_{1-6}$ alkyl (such as methyl, ethyl, or propyl), aryl, phenyl;

R$^2$ and R$^3$ are independently selected from the group consisting of hydrogen, C$_{1-10}$ alkyl, silyl, C$_{1-6}$ alkoxy, C$_{3-8}$ cycloalkyl, C$_{3-8}$ cycloalkoxy, aryl, aryloxy, C$_{1-10}$ amine, C$_{1-10}$ nitro, C$_{1-10}$ cyano, a halide (F, Cl, Br, I), and a 5- or 6-membered heterocycle containing from 1 to 4 heteroatoms selected from oxygen, sulfur, nitrogen and phosphorous;

R$^4$, R$^5$, and R$^6$ are independently selected from the group consisting of hydrogen, C$_{1-10}$ alkyl, C$_{1-10}$ halogenated alkyl (such as fluorinated alkyl) silyl, C$_{1-6}$ alkoxy, C$_{3-8}$ cycloalkyl, C$_{3-8}$ cycloalkoxy, aryl, aryloxy, C$_{1-10}$ amine, C$_{1-10}$ nitro, C$_{1-10}$ cyano a halide (F, Cl, Br, I), and a 5- or 6-membered heterocycle containing from 1 to 4 heteroatoms selected from oxygen, sulfur, nitrogen and phosphorous, or R$^4$ and R$^5$ together form a 5- or 6-membered cyclic system optionally containing from 1 to 4 heteroatoms, or $R^5$ and $R^6$ together form a 5- or 6-membered cyclic system optionally containing from 1 to 4 heteroatoms;

The L3 moiety has chain length (between Y and Y') of at least 2, preferably at least 3 atoms and is preferably a straight or branched aliphatic chain, or cyclic or aromatic moiety, that contains 2 to 30 carbon atoms, optionally containing 1 to 10 heteroatoms selected from N, O, F, Cl and Br.

Preferred L3 moieties are:

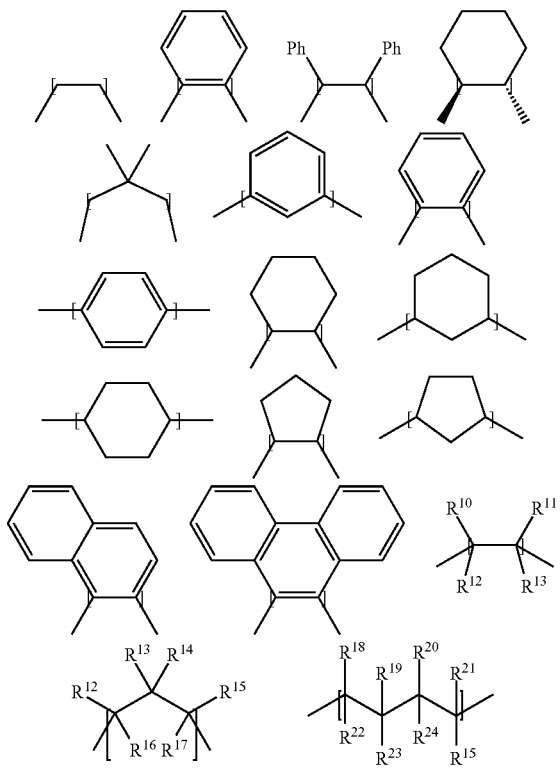

wherein $R_{10}$-$R_{25}$ are independently selected from the group consisting of hydrogen, $C_1$-$C_{10}$ alkyl, $C_{3-8}$ cycloalkyl, $C_{3-8}$ cycloalkoxy, and a 5- or 6-membered heterocycle containing from 1 to 4 heteroatoms selected from oxygen, sulfur, nitrogen and phosphorous.

Even more preferably, the catalyst compounds used in the process of the invention are compounds of general formula (III) below formula III

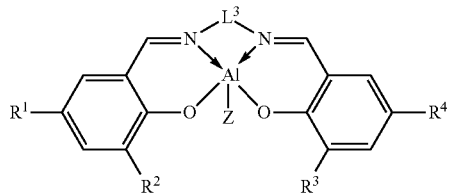

wherein

L3 and Z have the same meaning as defined above; and $R^1$, $R^2$, $R^3$ and $R^4$ are independently selected from the group consisting of hydrogen, $C_{1-10}$ alkyl, silyl, $C_{1-6}$ alkoxy, $C_{3-8}$ cycloalkyl, $C_{3-8}$ cycloalkoxy, aryl, aryloxy, $C_{1-10}$ amine, $C_{1-10}$ nitro, $C_{1-10}$ cyano, a halide (F, Cl, Br, I), and a 5- or 6 membered heterocycle containing from 1 to 4 heteroatoms selected from oxygen, sulfur, nitrogen, and phosphorous.

Substituents $R^1$, $R^2$, $R^3$, and $R^4$ in formula III which are larger or more bulky than as herein defined were found to have a negative effect on the polymerization rate. Without wishing to be bound by any theory, the inventors believe that bulky residues $R^1$, $R^2$, $R^3$, and $R^4$ induce steric hindrance around the aluminum core, which is believed to increase the energy barrier for the monomers to approach the core. This, in turn, will decrease the rate of the reaction substantially.

Therefore, in a preferred embodiment the substituents $R^1$, $R^2$, $R^3$ and $R^4$ for the catalyst of formula III are relatively small and can be for instance independently selected from the group consisting of hydrogen, methyl, ethyl, propyl, isopropyl, n-butyl, i-butyl, s-butyl, t-butyl, n-pentyl, i-pentyl, neopentyl, n-hexyl, 2,2-dimethylbutane, 2-methylpentane, 3-methylpentane, 2,3-dimethylbutane, cyclohexane, adamantyl, methoxide, ethoxide, n-butoxide, sec-butoxide, t-butoxide, aryloxide, halides. Even more preferably, the substituents $R^1$, $R^2$, $R^3$, and $R^4$ are independently selected from the group consisting of hydrogen, methyl, ethyl, propyl, n-butyl, i-butyl, s-butyl, and t-butyl. Most preferably, the substituents $R^1$, $R^2$, $R^3$, and $R^4$ are independently selected from the group consisting of hydrogen, methyl, and ethyl.

In an embodiment at least two of the substituents $R^1$, $R^2$, $R^3$, and $R^4$ are identical.

In a further embodiment, at least three of $R^1$, $R^2$, $R^3$, and $R^4$ are identical.

In a preferred embodiment all of $R^1$, $R^2$, $R^3$, and $R^4$ are identical. Such embodiment is preferred as it is easier to prepare such catalysts.

Substituent Z is preferably an alkoxide (—OR, wherein R is optionally substituted alkyl, optionally substituted aryl), a carboxylate (—OC(=O)R, wherein R is optionally substituted alkyl, optionally substituted aryl), an amine (—NR2, wherein R is optionally substituted alkyl, optionally substituted aryl), a thiolate (—SR, wherein R is optionally substituted alkyl, optionally substituted aryl), or borohydride ($BH_{4-x}R_x$, wherein x is an integer of from 1-3 and R is optionally substituted alkyl, optionally substituted aryl). These substituents are able to initiate the ring-opening polymerization reaction themselves. Compounds according to general formula (III) having a different Z substituent (such as a hydride, an optionally substituted alkyl, or an optionally substituted aryl) can be used in combination with a suitable initiator compound such as an alcohol, water, carboxylic acid, or amine.

The mechanism and initiation of ring-opening polymerization is well known to the skilled person and is for instance described in "Handbook of Ring Opening Polymerization, 2009, Eds. Philippe Dubois, Olivier Coulembier, Jean-Marie Raquez, Wiley VCH, ISBN: 978 3 527 31953 4".

In a preferred embodiment Z is selected from the group consisting hydrogen, methyl, ethyl, n-octyl, methoxy, ethoxy, and benzoxy (—$OCH_2C_6H_5$).

Good results were obtained with compounds according to general formula (III), wherein $R^1$, $R^2$, $R^3$, and $R^4$ are independently selected from the group consisting of hydrogen, methyl, ethyl, propyl, isopropyl, butyl, n butyl, isobutyl, t butyl, and wherein Z is selected from the group consisting of hydrogen, methyl, ethyl, i-propyl, t butyl, the compound of formula (III) then being used in combination with a suitable initiator.

Cyclic Esters

The first cyclic ester used in the process has a ring size from 4-11, preferably from 4-8 atoms. Preferably the first cyclic ester is a lactone, which is a cyclic ester having inter alia a single ester group in the ring. The first cyclic ester may be for example be β-propiolactone, β-butyrolactone, 3-methyloxetan-2-one, γ-valerolactone, caprolactone, ε-caprolactone, ε-decalactone, 5,5-dimethyl-dihydro-furan-2-one, (S)-γ-hydroxymethyl-γ-butyrolactone, γ-octanoic lactone, γ-nonanoic lactone, δ-valerolactone, δ-hexalactone, δ-decalactone, δ-undecalactone, δ-dodecalactone, glycolide, lactide (L, D, meso), heptalactone, octalactone, nonalactone, decalactone.

Particularly preferred first cyclic esters are ε-caprolactone, ε-decalactone, β-butyrolactone, glycolide and lactide in view of their commercial availability and reactivity. Preferably the first cyclic ester has only one ester functionality in the ring.

The second cyclic ester used in the process has a ring size from 12-40 atoms. Preferably however the ring size of the second cyclic ester is from 12 to 24 atoms. Preferably the second cyclic ester is a lactone. The second cyclic ester may be for example 11-undecalactone, 12-dodecalactone, 13-tridecalactone, 14-tetradecalactone, 15-pentadecalactone (or ω-pentadecalactone), globalide, 16-hexadecalactone, ambrettolide, 17-heptadecalactone, 18-octadecalactone, 19-nonadecalactone. Particularly preferred second cyclic esters are pentadecalactone, 18-octadecalactone, globalide and ambrettolide in view of their commercial availability and/or ease of manufacture and good reactivity. Preferably the second cyclic ester has only one ester functionality in the ring.

In a particularly preferred embodiment the first cyclic ester is ε-caprolacton and the second cyclic ester is ω-pentadecalactone.

The first and/or second cyclic esters, in particular the lactones, may be in any isomeric form and may further contain organic substituents on the ring that do not prevent the ring-opening polymerisation. Examples of such cyclic esters include 4-methyl caprolactone, 1,5-dioxepan-2-one (ether substituent at the 3 position), the lactone of ricinoleic acid (a 10-membered ring with a hexyl branched on the (co-1)-position) or the hydrogenated version of thereof, 13-hexyloxacyclotridecan-2-one (a macrocycle with a hexyl branch on the co-position), and the like.

It is further possible that the first and/or second cyclic ester comprise one or more unsaturations in the ring. Examples of such cyclic esters include 5-tetradecen-14-olide, 11-pentadecen-15-olide, 12-pentadecen-15-olide (also known as globalide), 7-hexadecen-16-olide (also known as ambrettolide), 9-hexadecen-16-olide.

The first and/or second cyclic ester may further have one or more heteroatoms in the ring, provided that such do not prevent the ring-opening polymerisation. Examples of such cyclic esters include 10-oxahexadecanolide, 11-oxahexadecanolide, 12-oxahexadecanolide, and 12-oxahexadecen-16-olide. Preferably however, the first and/or second cyclic esters do not contain heteroatoms in the ring.

The term ring-size as used herein refers to the number of atoms that form the ring in the cyclic ester. For example caprolactone has a seven membered ring, i.e. a ring size of seven. The ring of caprolactone consists of six carbon atoms and one oxygen atom.

In a preferred embodiment one first cyclic ester having a first ring size of from 4 to 11 atoms is copolymerized with one second cyclic ester having a second ring size of from 12 to 40 atoms.

Process

In the process described herein, the molecular ratio between the combined amount of first and second cyclic esters and the catalyst is preferably in the range of 20:1-1000:1, preferably in the range of 40:1-750:1, more preferably in the range of 50:1-500:1. Optionally the catalyst used in the process of the invention may be applied in combination with an initiator, preferably in about equimolar amount. Suitable initiators for the process of the present invention include protic reagents such as alcohols, water, carboxylic acids, and amines. Such initiators are well known to the person skilled in the art and examples thereof can, for instance, be found in Clark et al., Chem. Commun. 2010, 46, 273-275 and references cited therein, which document is herewith incorporated by reference.

In an embodiment where the ring-opening copolymerization is performed in the presence of an initiator, the molar ratio between initiator and catalyst is usually about 1:1, unless the reagent used as initiator is also used as chain transfer agent. In such case the molar ratio between the cyclic esters and the initiator can be used as a tool for tuning the molecular weight of the copolymer that is prepared according to the inventive process. To that extent the present inventors found that the molecular weight of the copolymer increases almost linearly with an increasing cyclic ester to initiator ratio.

In an embodiment where the initiator is used as a chain transfer agent, then the initiator is added in excess with respect to the catalyst to produce more than one chain per active site. The amount of applied catalyst can be reduced in the presence of a chain transfer agent due to an increase in catalyst efficiency. If present, the molar amount of chain transfer agent will typically be in the range of 1-10000 times the molar amount of catalyst, preferably in the range of 10-100 times the molar amount of catalyst.

The ring-opening polymerization reaction is preferably performed in an inert atmosphere, such as in a nitrogen atmosphere for the reason that the, in particular aluminum salen complex, catalysts perform better under inert atmosphere and preferably in the absence of (significant amounts of) water.

Preferably the copolymerisation in process of the present invention is carried out in one step, meaning that the first and second cyclic esters are reacted simultaneously. Such technique is sometimes referred to as a one-pot synthesis. A sequential feed technique, wherein monomers are added in sequences therefore cannot be considered as such a one-step technique.

If desired, the ring-opening copolymerization of the invention can be performed in the presence of a solvent, such as aliphatic or aromatic hydrocarbons (e.g., heptane, toluene), halogenated aliphatic or aromatic hydrocarbons (e.g., dichloromethane, bromobenzene), and ethers (e.g., diethyl ether). The solvent may be used to dissolve the cyclic esters and/or to increase the polymerization kinetics and selectivity. The ring-opening copolymerization may however also be carried out in bulk monomer.

The process of the invention can be used for the preparation of a copolymer with a number average molecular weight of 10000 g/mol or more as measured by size exclusion chromatography in 1,2,4 trichlorobenzene at 160° C. using polyethylene standards. Preferably the number average molecular weight is 15000 g/mol or more, or even 20000 g/mol or more.

In an embodiment, the number average molecular weight of the copolymer prepared by the process of the invention is in the range of 10000-200000 g/mol. The obtained molecular weight depends on the molar ratio between the cyclic esters and the catalyst and further on the types of first and second cyclic ester (s) that are employed in the reaction. Preferably the number average molecular weight is 15000 g/mol or more, or even 20000 g/mol or more. Even more preferred are number average molecular weights of at least 35000 g/mol, at least 50000 g/mol whereas a practical upper limit may be 300000 g/mol or 200000 g/mol or 150000 g/mol.

In a special embodiment of the invention the copolymer has a number average molecular weight of 100000 g/mol or more, such as in the range of 100000-200000 g/mol.

Copolymers prepared by the process of the invention can have a polydispersity index in the range of 1.2-5, such as in the range of 1.5-4, polydispersity index being defined as the ratio between the weight average molecular weight and the number average molecular weight ($M_w/M_n$).

The process of the invention was found to result in relatively high ring-opening polymerisation rates for the first cyclic esters and a medium polymerisation rate of the second cyclic esters, in particular when the process involves a catalyst having an L3 organic ligand having a chain length between Y and Y' of at least three atoms.

Potentially this difference in reaction rate would allow the preparation of a block or at least blocky copolymer using a 1-pot synthesis process, i.e. a polymerisation where both the first and second cyclic ester are added to the reaction vessel together. Surprisingly the present inventors observed that rather than a blocky copolymer a random copolymer was obtained. Such was confirmed by NMR measurements as well as plots of the melting point of the copolymer versus the composition in terms of relative amounts of first and/or second cyclic ester. Without willing to be bound to it, the present inventors ascribe this effect to the catalyst that allows for efficient and quick transesterification resulting in the formation of a random copolymer rather than a block copolymer. In addition to the above the present inventors observed that a sequential feed of first and second cyclic esters initially results in a block or blocky copolymer, however, that the transesterification upon continued duration of the reaction still results in a random copolymer. In case it would be desirable to form a block copolymer rather than a random copolymer the process of the present invention would require a further step of deactivating the catalyst after the monomer added in the latest sequence has reacted to a desired conversion rate. The skilled person will understand that the blocky copolymer so obtained will not be a perfect block-copolymer. It should further be understood that for the formation of a random copolymer a step of deactivating the catalyst may be excluded. The skilled person will further understand that the sequence order of feeding the monomers may not result in a blocky copolymer at all.

Advantageously, the process can be conducted at relatively high process temperatures, at which enzymes used for enzymatic ring-opening polymerization of lactones would normally degrade. Typically, the process of the invention can be performed at a temperature in the range of from 70-180° C., such as in the range of from 80-175° C., or in the range of from 90-150° C.

Since the amount of catalyst used in the process of the invention is relatively low, there is no direct need for separating the catalyst from the copolymer product once prepared. However, should there be a need for separating the catalyst from the copolymer for whatever reason then this can be easily done for instance by precipitation of the polymer in a suitable solvent.

Copolymer Randomness

The copolymer of the present invention is a random copolymer with a randomness of at least 0.50, preferably at least 0.80, more preferably at least 0.90, more preferably at least 0.95, most preferably at least 0.98.

By definition the randomness is lower than 2.0 as a value of 2.0 belongs to a perfect alternating copolymer. A preferred range for the randomness of the copolymer of the present invention is from 0.5 to 1.5, more preferably from 0.5 to 1.

Randomness as used herein is defined as follows:

$$\text{Randomness} = \left(\frac{L_{1-random}}{L_1} + \frac{L_{2-random}}{L_2}\right)/2 \qquad \text{Equation 1}$$

wherein $L_1$=the average sequence length of sequences originating from the first cyclic ester in the copolymer. First the ratio between first cyclic ester-first cyclic ester and first cyclic ester-second cyclic ester diads are measured using $^{13}$C NMR technique after which $L_1$ is calculated as follows:

$$L1 = 1 + \left(\frac{I_{1st-1st}}{I_{1st-2nd}}\right) \qquad \text{Equation 2}$$

wherein $I_{1st-1st}$ represents the integral of the first cyclic ester-first cyclic ester diad as determined with $^{13}$C NMR and $I_{1st-2nd}$ represents the integral of the first cyclic ester-second cyclic ester diad determined with $^{13}$C NMR.

$L_2$=the average sequence length of sequences originating from the second cyclic ester segment in the copolymer. First the ratio between second cyclic ester-second cyclic ester and second cyclic ester-first cyclic ester diads are measured using $^{13}$C NMR technique after which $L_2$ is calculated as follows:

$$L_2 = 1 + \left(\frac{I_{2nd-2nd}}{I_{2nd-1st}}\right) \qquad \text{Equation 3}$$

wherein $I_{2nd-2nd}$ represents the integral of the second cyclic ester-second cyclic ester diad as determined with $^{13}$C NMR and $I_{2n-1st}$ represents the integral of the second cyclic ester-first cyclic ester diad determined with $^{13}$C NMR.

$L_{1-random}$=the average length of first cyclic ester segments in a fully random copolymer and is determined as follows:

$$L_{1-random} = \frac{(X_1 * C_{1,t=0})}{(X_2 * C_{2,t=0})} + 1 \qquad \text{Equation 4}$$

$L_{2-random}$=the average length of second cyclic ester segments in a fully random copolymer and is determined as follows:

$$L_{2-random} = \frac{(X_2 * C_{2,t=0})}{(X_1 * C_{1,t=0})} + 1 \qquad \text{Equation 5}$$

$X_1$ and $X_2$ representing the conversion, for example in %, of the first and second cyclic esters respectively, $C_{1,t=0}$ and $C_{2,t=0}$ representing the starting concentrations, for example in mold, of the first and second cyclic esters respectively.

For a perfect random copolymer the randomness is 1, whereas for a perfect block copolymer the randomness is 0.

For the purpose of the present invention the following classification may be made. Copolymers having a randomness (R) of more than 0 yet lower than 0.1 may be regarded as blocky copolymers (these are not perfect block copolymers). Such copolymers generally show two distinct melting peaks corresponding to the melting points of the respective blocks. Copolymers having a randomness of from 0.1 to 0.5 may be referred to as medium random copolymers. Such copolymers tend to show a significantly broadened melting peak rather than two distinct melting peaks as observed for copolymers having a randomness of between 0 and 0.1. Copolymers having a randomness of higher than 0.5 to 0.9 may be referred to as highly random copolymers. The present inventors observed that at a randomness value of 0.5 or higher the copolymers show a single, more narrow, melting peak. Above a randomness of 0.5, the melting peak becomes narrow with increasing randomness number. Without wishing to be strictly bound to it, the present inventors believe that the melting peak is indicative for the presence of heterogeneous domains. Consequently, if no heterogeneous domains are present (as is the case for copolymers having a randomness of at least 0.5) the (mechanical) properties of the copolymer are more uniform. Finally, copolymers having a randomness of above 0.9 may be referred to as fully random copolymers. Copolymers having a randomness of above 1 include a certain amount of alternating first and second cyclic esters. Above a randomness value of 1.9 the copolymer would be considered as an alternating copolymer.

The copolymers obtained with the process of the invention can be used in a wide variety of applications depending on their respective properties, such as number average molecular weight, polydispersity index, type and respective amounts of first and second cyclic esters etc.

The copolymers may be used for the fabrication of fibers with high mechanical strength. In particular copolymers with high molecular weight and relatively low polydispersity index are suitable for this purpose.

The copolymers may further be used for biomedical applications. In this respect it is highly advantageous that the degradability of the copolymers can be tuned by the choice of comonomer. For example it is known that (co)polymers from lactones having relatively low ring size are more biodegradable than lactones with a high ring size. So, by tuning the composition (i.e. choice and amount of first and second lactones) of the copolymer the desired biodegradability can be obtained. The more random the copolymer, the more uniform this biodegradability will be.

Examples of biomedical applications include screws (such as for bone), scaffolding, sutures, drug delivery devices, etc.

The copolymers may further be used in polymer compositions further comprising other polymer materials such as for example polyesters, polycarbonates, polyamides and polyolefins.

The process of the invention further allows copolymers to be obtained with a tuned melting point between the melting points of the homopolymers of the first and second cyclic esters. Such tuning may be advantageous in for example 3D printing applications. The copolymers may further be used to manufacture moulded parts and films.

The invention will now be further illustrated by means of the Examples, and Figures which are not intended to be limitative in any way.

Reagents

All solvents and reagents were purchased from commercial sources unless stated otherwise. p-Xylene (99.9%) was dried over sodium and fractionally distilled under nitrogen and degassed prior to use. Hexadecanol, pentadecalactone, ε-decalactone, ambrettolide, ε-caprolactone and β-butyrolactone were freshly distilled from $CaH_2$ under nitrogen prior to use. Lactic acid was dried over $CaH_2$ and sublimed prior to use. Toluene was passed through purification columns and degassed before use.

Analytical $^1$H NMR and $^{13}$C NMR spectra were recorded in 5 mm tubes on a Varian Mercury 400 MHz spectrometer equipped with an autosampler at ambient probe temperature in $CDCl_3$. Chemical shifts are reported in ppm vs. tetramethylsilane (TMS) and were determined by reference to TMS. Copolymerization reactions were followed by gas chromatography (GC) using a Shimadzu GC-2010 equipped with a Flame Ionization Detector (FID) employing a CP-WAX 52 CB, 0.25 mm×25 m (DF=0.2 μm) column. Injection and detection temperatures were both set at 270° C. The internal standard method, taking p-xylene as the internal standard, was used to determine the cyclic ester (lactone) conversion; all samples were measured using a Shimadzu AOC-20i autosampler.

Size exclusion chromatography (SEC) of PPDLs was performed at 160° C. using a Polymer Laboratories PLXT-20 Rapid GPC Polymer Analysis System (refractive index detector and viscosity detector) with 3 PLgel Olexis (300× 7.5 mm, Polymer Laboratories) columns in series. 1,2,4-Trichlorobenzene was used as eluent at a flow rate of 1 $mL \cdot min^{-1}$. The molecular weights were calculated with respect to polyethylene standards (Polymer Laboratories).

A Polymer Laboratories PL XT-220 robotic sample handling system was used as autosampler.

Differential scanning calorimetry (DSC) analyses for determination of the melting point of the (co)polymers were carried out on a DSC Q100 from TA Instruments at a heating rate of 10° C. $min^{-1}$. First and second runs were recorded after cooling down to ca. 20° C. The melting temperatures reported correspond to the melting peaks in the second runs.

Catalyst Preparation

Catalysts were prepared by procedures known in the art such as for example disclosed in WO 2012/065711. The preparation of salen-type catalysts is well known to the skilled person.

Experiment 1

Homo-Polymerisation

Kinetics on the polymerization of the cyclic esters ε-caprolactone (eCL), ω-pentadecalactone (PDL), ambrettolide (Amb), di-ester of butylene adipate (DBA), lactic acid (LLA), ε-decalactone (eDL), β-butyrolactone (bBL) were studied. Of these cyclic esters eCL, LLA, eDL and bBL are species of the first cyclic esters as defined herein whereas PDL, DBA and Amb are species of second cyclic ester as defined herein.

The cyclic esters were reacted with two different catalysts as in Table 1 below:

TABLE 1

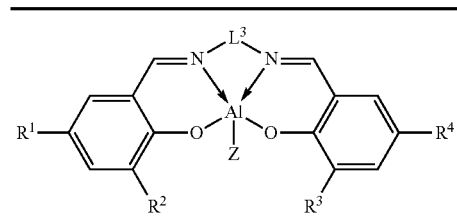

(Formula III)

R1 = H
R2 = H
R3 = H
R4 = H
Z = $C_2H_5$

Catalyst 1

L3 = 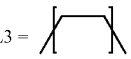

Catalyst 2

L3 = 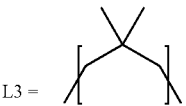

As an initiating group hexadecanol was used. To that extent the catalysts were premixed with an equimolar amount of hexadecanol at a temperature of 100° C. prior to polymerisation. The polymerisation was carried out in p-xylene at a temperature of 100° C. under a nitrogen atmosphere. For 1.00 mole of cyclic ester 10.0 mmole of catalyst was used. The conversion of monomers was measured using $^1$H NMR.

The results of these experiments show that for Catalyst 1 the reaction rate of first cyclic esters (except for eCL) is lower than the reaction rate for second cyclic esters. The behaviour of eCL may be explained by the fact that the other first cyclic esters have a side chain on the ring which to some extent may cause sterical hindrance and as such result in a somewhat lower polymerisation rate. For Catalyst 2 the reaction rates for the first cyclic esters was surprisingly found to increase significantly while the reaction rate for the second cyclic esters remained more or less unchanged (i.e. about 0.6 conversion after 20 minutes). The present inventors ascribe this effect to the increase in size of L3 (in the catalyst) from two to three atoms. Table 2 below summarises the results from which the same conclusions can be drawn.

TABLE 2

| Monomer | Reaction Rate constant k (L · mol$^{-1}$ · min$^{-1}$) | |
|---|---|---|
| | Cat. 1 | Cat. 2 |
| PDL (2$^{nd}$) | 5.2 | 5.6 |
| Amb (2$^{nd}$) | 4.1 | 5.2 |
| DBA (2$^{nd}$) | 3.9 | 4.9 |
| LLA (1$^{st}$) | 3.5 | 36.4 |
| eCL (1$^{st}$) | 44.0 | >921$^a$ |
| eDL (1$^{st}$) | 0.4 | 8.5 |
| bBL (1$^{st}$) | 0.2 | 12.9 |

$^a$determined using a conversion of 0.99 at 30 s min

Figure 2:
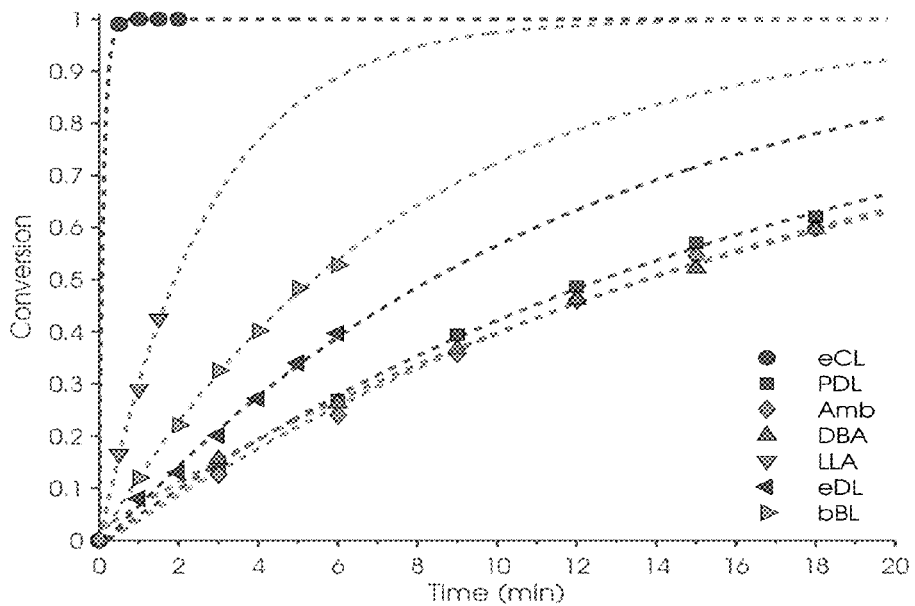
FIG. 2 is a graph showing the conversion as a function of time for the homopolymerisation of certain cyclic esters using Catalyst 2.

Several interesting features for the ring-opening polymerisation catalyzed by Catalyst 1 can be observed in FIGS. 1, 2 and Table 2. First of all, all second cyclic esters have similar and a relatively high reaction rate coefficient ranging from 3.9-5.2 l/mol·min. Hence, it appears that the small differences in ring-size for these second cyclic esters do not yield significant differences in reaction rate, which can be explained by the fact that the second cyclic esters have little to no ring strain. The inventors believe that the reaction rate is mainly be determined by the steric hindrance that the monomer experiences from its own large size while coordinating to the active site. For strained rings, the reactivity may vary from one monomer to another. In that respect it is noted that eCL polymerizes fast using Catalyst 1 with a reaction rate constant of 44 l/mol·min, while eDL, which has the same ring size as eCL but contains a butyl branch at the α-methylene position, reacts two orders of magnitude slower. Without willing to be bound to theory the inventors believe that this is due to the steric hindrance of the butyl branch at the β-position of the growing chain, which hampers an incoming, also branched, monomer from coordinating. The same trend can be observed for bBL, which is polymerized quite slowly by Catalyst 1. For LLA, steric hindrance is also a determining factor, but it seems to affect the rate less than in the case of eDL and bBL. The most remarkable difference between Catalyst 1 and Catalyst 2 can be found in comparing the reaction rates between first and second cyclic esters (FIGS. 1,2 Table 2). As can be seen, the reaction rate for the second cyclic esters changes only slightly when Catalyst 1 is compared with Catalyst 2. However, the reaction rate increases dramatically for the first cyclic esters by at least one order of magnitude. For eCL, the rate was so high that injection of the monomer in the vial and subsequent quenching after 30 s yielded a conversion >99%. Therefore, the rate constant was determined using this sole value, and is at least 900 l/mol·min.

Experiment 2

Experiment 1 made it clear that catalysts 1 and 2 show a difference in reactivity towards the first and second cyclic esters, in particular for catalyst 2. This difference in reactivity was expected to bring the potential to synthesize block-copolymers, consisting of a first cyclic ester block and a second cyclic ester block, in a one-pot reaction through kinetic resolution.

To that extent PDL and eCL were first copolymerized in a one pot reaction with catalyst 1, wherein the concentrations of PDL and eCL were equal and 0.59 mol. The catalyst concentration of catalyst 1 was 13.0 mmol/l and the reaction temperature was 100° C. Samples were taken at regular time intervals.

As the peaks of PDL, PPDL, and PCL in $^1$H NMR cannot be clearly distinguished, the conversions were determined by measuring the residual amount of PDL using GC-FID and subsequent determination of the eCL conversion with $^1$H NMR. Both monomers were found to show the same kinetics as during homopolymerization, which was expected to result in a blocky structure, consisting of a tapered PCL-PPDL block and a PPDL block.

The polymers obtained at different reaction times were precipitated twice in methanol and dried under vacuum. To investigate the monomer sequence in the poly(eCL-co-PDL) copolymers, $^{13}$C NMR was used to determine the ratio of PDL-PDL, eCL-eCL, eCL-PDL, and PDL-eCL linkages, by comparing the integration of the diads caused by the α-methylene carbons for each of these linkages, which all have distinct resonances in the 63.9-64.6 region.

Figure 3:
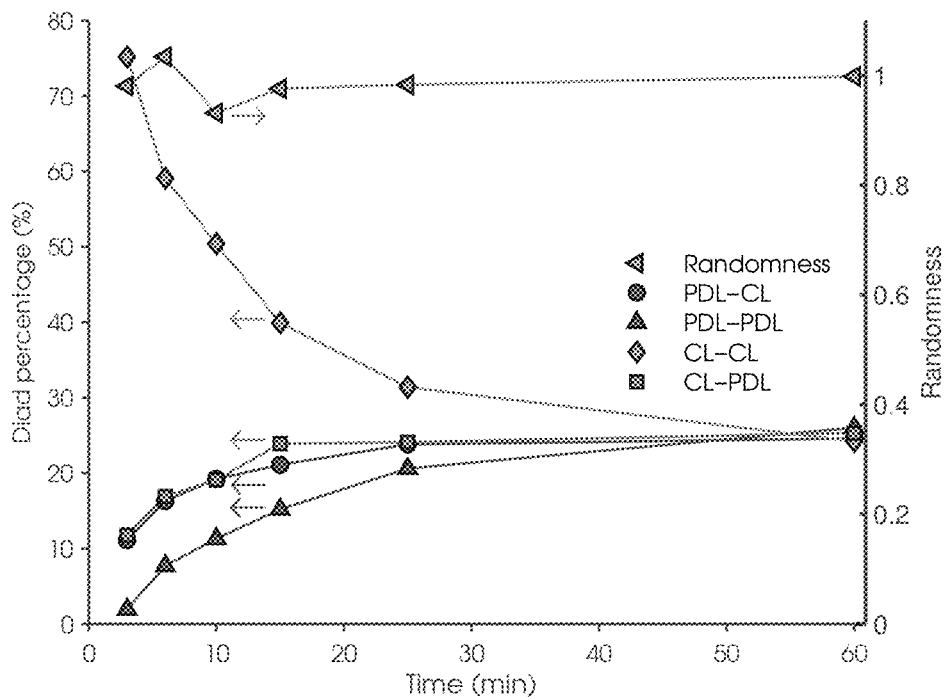
FIG. 3 is a graph showing the diad percentage as a function of time during the one-pot copolymerisation of eCL and PDL using Catalyst 1.

From FIG. 3 it can be seen that initially a high number of CL-CL diads is present, which is caused by the high conversion of CL in the first minutes of polymerization. However, as the reaction continues, all diad fractions approach 0.25. From the diad fractions it can be calculated that the randomness is about 1 during the reaction, meaning that, rather than the expected (tapered) block copolymer, a fully random copolymer is obtained. From this it is concluded that transesterification catalyzed by Catalyst 1 is very fast and is at least in the same order of magnitude as the rate of polymerization of PDL.

Figure 4:
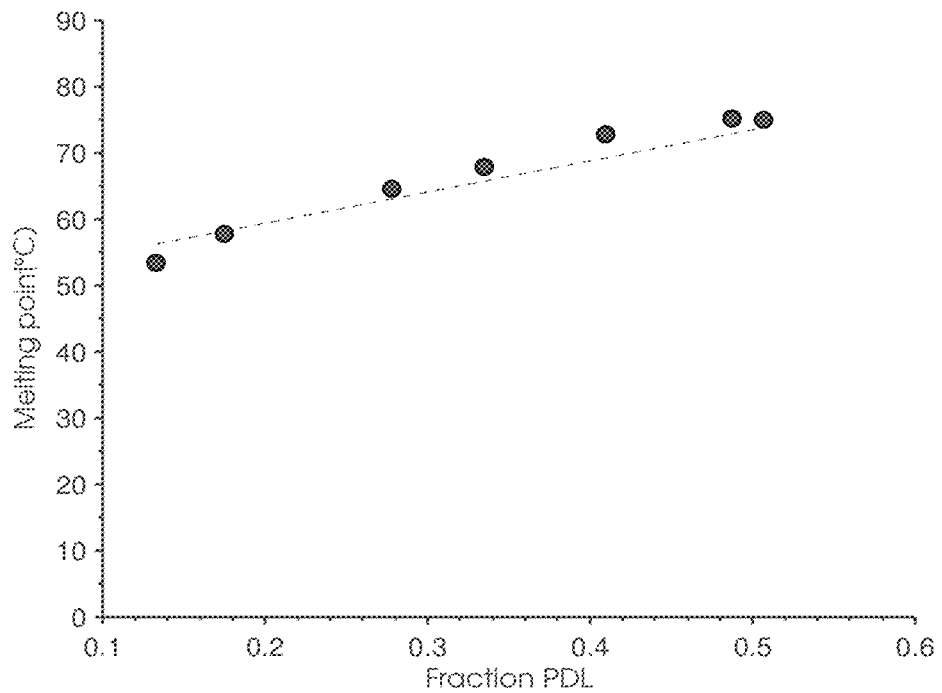
FIG. 4 is a graph showing the melting point of a PDL-eCL copolymer, prepared in a one-pot copolymerisation using Catalyst 1, as a function of the PDL content.

The high randomness of the poly(eCL-co-PDL) copolymers obtained is also confirmed by the relation between composition and melting point, which practically is a linear combination of the melting point of the two homopolymers as can be observed in FIG. 4.

Experiment 3

In a second copolymerisation experiment eCL and PDL were copolymerized using Catalyst 2. The concentration of PDL was 0.50 mold the concentration of eCL was 0.51 mold and the concentration of the catalyst 2 was 10 mmol/l. Again, the monomers were found to show the same kinetics as seen in the individual homopolymerizations. Reaction temperature was 100° C. Samples were taken at regular time intervals.

Contrary to the copolymerisation using Catalyst 1 in Experiment 2, the eCL was found to be already converted before the reaction mixtures was heated to the desired reaction temperature. The PDL gradually polymerized thereafter. Based on this observation, a nearly perfect block copolymer poly(eCL-co-PDL) was expected.

Figure 5:
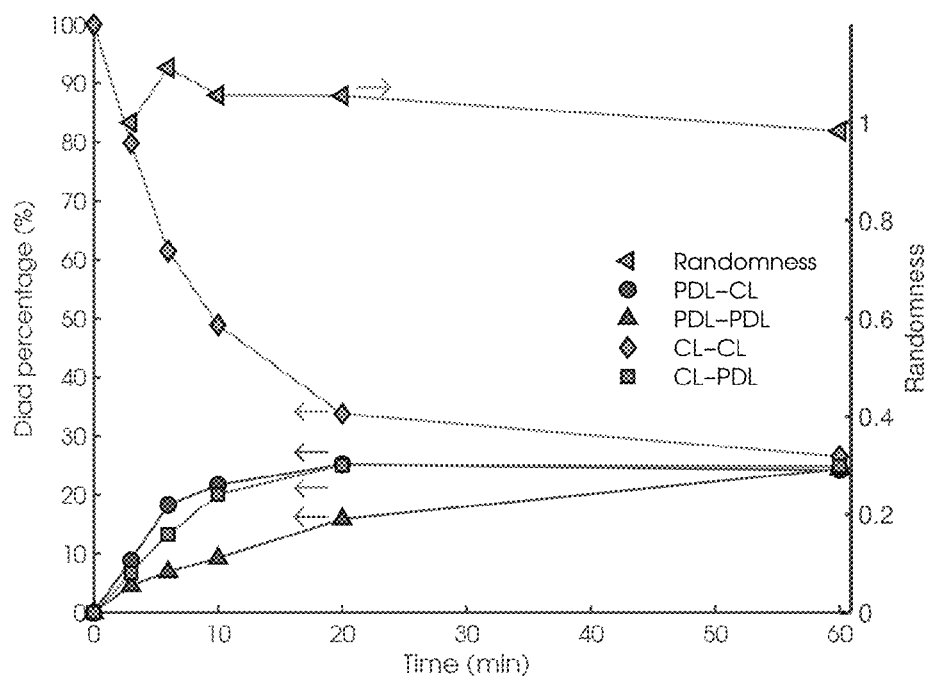
FIG. 5 is a graph showing the diad percentage as a function of time during the one-pot copolymerisation of eCL and PDL using Catalyst 2.

However, from FIG. 5 it is clear that next to the eCL-eCL and PDL-PDL linkages, the number of PDL-eCL and eCL-PDL linkages also rapidly increases until all the diads reach a fraction of about 0.25. When the randomness is calculated from these results, it appears that all copolymers obtained during the polymerization are substantially fully random copolymers, which the inventors believe can be attributed to fast transesterification.

Figure 6:
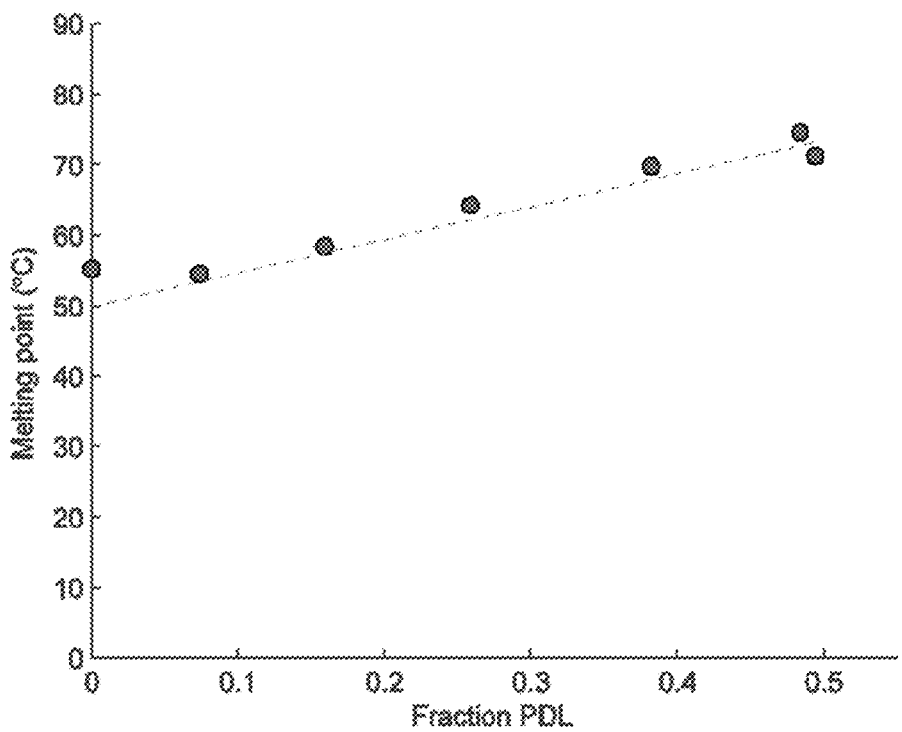
FIG. 6 is a graph showing the melting point of a PDL-eCL copolymer, prepared in a one-pot copolymerisation using Catalyst 2, as a function of the PDL content.

FIG. 6 confirms this in a similar manner as FIG. 4 and shows the melting point of the copolymers as a function of the fraction PDL. FIG. 6 clearly shows a linear relation of the melting point versus the fraction PDL the upper and lower limits thereof corresponding to the PDL and eCL melting points respectively. From this it is concluded that catalyst 2 is also a highly efficient transesterification catalyst, for which the rate of the transesterification is at least in the same order of magnitude as the rate of polymerization of PDL.

Experiment 4

Following these "one pot" copolymerisation Experiments 2 and 3 the present inventors made a further copolymerisation experiment, using Catalyst 2 and applying a sequential feeding technique for feeding of the monomers. To that extent PDL was first polymerized in six separate crimp cap vials using Catalyst 2 at a concentration of 17.0 mmol/l where the concentration of PDL was 0.83 mold at a reaction temperature of 100° C. The polymerisation was carried out in in p-xylene for 90 minutes, which resulted in full conversion of the PDL. Subsequently, 500 mg of a solution of eCL in p-xylene wherein the concentration of eCL was 1.8 mold was injected in five of the vials, and the reactions were terminated at 1 (t1), 5 (t5), 10 (t5), 60 (t60), and 1410 minutes (t1410), respectively.

As can be seen in Table 3 all samples showed nearly full PDL and eCL conversion. When the diads of the copolymers obtained at different times are analyzed, a randomness of 0.05 is observed for t1. Such value for the randomness means that the obtained copolymer at t1 could be referred to as a blocky polymer. It does have, however, a certain random character already so that it would be improper to refer to this sample as a true (or perfect) block copolymer. Likewise, unless the catalyst is deactivated the transesterification will continue, in particular when such polymer would be processed at higher temperatures, for example during injection moulding or compounding. The blocky structure would then quickly be lost in favor of higher randomness of the copolymer.

Upon increasing reaction time copolymers having an increased randomness were obtained. After one hour (t60) the randomness was well above 0.90 and as such the resulting copolymer was found to be a substantially fully random copolymer.

Figure 7:
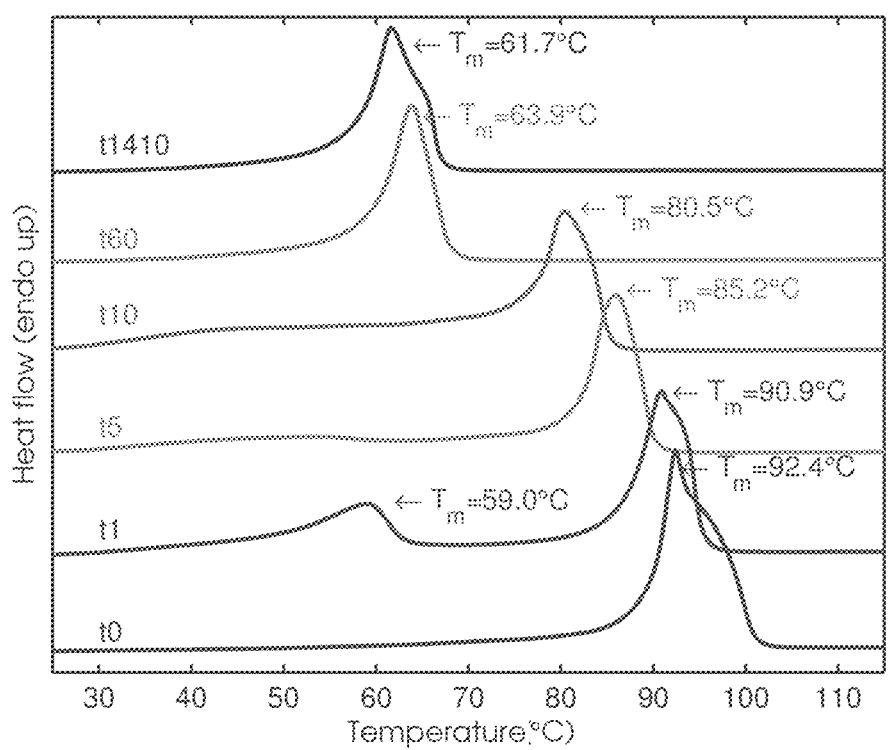
FIG. 7 is a DSC plot of certain samples of polymer taken during the copolymerisation of eCL and PDL using a sequential feed technique.

The randomness was also confirmed by DSC measurements, summarised in FIG. 7. Sample t1 showed two melting points, at 90.9° C. and 59.0° C., respectively, which is a typical feature of a block(y) copolymer. The melting point at 90.9° C. corresponding to a PDL rich block, the melting point of 59.0° C. corresponding to an eCL rich block. Since the melting point of the PCL-block is higher than the melting point of PCL homopolymer the present inventors conclude that the PCL-block contains some PDL. Likewise, since the melting point of the PPDL-block is lower than the melting point of PPDL homopolymer the present inventors conclude that the PPDL-block already contains some eCL.

When the copolymers are further allowed to react, transesterification dominates the reaction and a copolymer having a randomness of 0.22 is obtained at t5. The t5 copolymer only has one clear melting peak having a long low temperature tail, indicative for the presence of a wide variety of PPDL-PCL compositions, which predominantly melt at 85.2° C.

Subsequent longer transesterification times lead to a further decrease in melting point, down to 61.7° C. for t1410, which is comparable with fully random copolymers having a similar composition.

The present inventors confirmed that the two melting peaks for sample t1 are not a result of a blend of two homopolymers by using size exclusion chromatography.

TABLE 3

| Sample | T (min)[a] | Conversion (%) PDL[b] | Conversion (%) eCL[c] | Polymer composition. (mol %) CL | Polymer composition. (mol %) PDL | Diad integral ratios[d] PDL-CL | Diad integral ratios[d] PDL-PDL | Diad integral ratios[d] CL-CL | Diad integral ratios[d] CL-PDL | Randomness |
|---|---|---|---|---|---|---|---|---|---|---|
| t0 | 0 | 98.2 | — | 0 | 1 | 0.0 | 100.0 | 0.0 | 0.0 | |
| t1 | 1 | 96.2 | 99 | 0.72 | 0.28 | 2.1 | 26.3 | 71.6 | 0.0 | 0.05 |
| t5 | 5 | 98.2 | 99 | 0.71 | 0.29 | 5.5 | 25.8 | 65.2 | 3.6 | 0.22 |
| t10 | 10 | 98.2 | 99 | 0.71 | 0.29 | 5.8 | 22.4 | 65.1 | 6.7 | 0.30 |
| t60 | 60 | 98.4 | 99 | 0.71 | 0.29 | 19.9 | 8.8 | 52.2 | 19.2 | 0.96 |
| t1410 | 1410 | 98.4 | 99 | 0.71 | 0.29 | 19.4 | 9.1 | 52.7 | 18.9 | 0.94 |

[a] time after addition of eCL (after 90 min homopolymerization of PDL).
[b] Determined using GC-FID.
[c] Determined using $^1$H NMR.
[d] Determined using $^{13}$C NMR.

Unless specified herein otherwise, alkyl groups, including alkoxides can have 1 to 22 carbon atoms, aryl groups, including aryloxides can have 6 to 32 carbon atoms, carboxylates, thiocarboxylates, and dithiocarboxylates can have 1 to 22 carbon atoms, amides and thiolates can have 1 to 22 carbon atoms, and halides can be F, Cl, Br, or I.

"Substituted" as used herein means a compound or radical substituted with at least one (e.g., 1, 2, 3, 4, 5, 6 or more) substituents independently selected from a halide (e.g., F⁻, Cl⁻, Br⁻, I⁻), a hydroxyl, an alkoxy, a nitro, a cyano, an amino, an azido, an amidino, a hydrazino, a hydrazono, a carbonyl, a carbamyl, a thiol, a C1 to C6 alkoxycarbonyl, an ester, a carboxyl, or a salt thereof, sulfonic acid or a salt thereof, phosphoric acid or a salt thereof, a $C_1$ to $C_{20}$ alkyl, a $C_2$ to $C_{16}$ alkynyl, a $C_6$ to $C_{20}$ aryl, a $C_7$ to $C_{13}$ arylalkyl, a $C_1$ to $C_4$ oxyalkyl, a $C_1$ to $C_{20}$ heteroalkyl, a $C_3$ to $C_{20}$ heteroaryl (i.e., a group that comprises at least one aromatic ring, wherein at least one ring member is other than carbon), a $C_3$ to $C_{20}$ heteroarylalkyl, a $C_3$ to $C_{20}$ cycloalkyl, a $C_3$ to $C_{15}$ cycloalkenyl, a $C_6$ to $C_{15}$ cycloalkynyl, a $C_5$ to $C_{15}$ heterocycloalkyl, or a combination including at least one of the foregoing, instead of hydrogen, provided that the substituted atom's normal valence is not exceeded.

The invention claimed is:

1. A process for preparing a copolymer comprising providing a first cyclic ester having a first ring size from 4 to 11 atoms and a second cyclic ester having a second ring size from 12 to 40 atoms and subjecting the first and second cyclic esters to ring-opening copolymerization using as catalyst a compound of formula I formula I

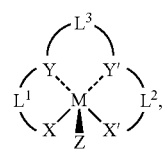

wherein
M is a trivalent metal selected from the group consisting of aluminium, titanium, vanadium, chromium, manganese, cobalt, yttrium, scandium, and lanthanides;
X and X' are both a heteroatom and may be the same or different;
Y and Y' are independently selected from the group consisting of O, N, S and P;
Z is selected from the group consisting of hydrogen, borohydrides, aluminium hydrides, carbyls, silyls, hydroxides, alkoxides, aryloxides, carboxylates, thiocarboxylates, dithiocarboxylates, carbonates, carbamates, guanidates, amides, thiolates, phosphides, hydrazonate, imide, cyanide, cyanate, thiocyanate, azide, nitro, siloxides and halides;
L1 is an organic moiety linking X and Y;
L2 is an organic moiety linking X' and Y';
L1 and L2 are the same or different;
L3 is an organic moiety linking Y and Y' and has a chain length between Y and Y' of at least 2 atoms; and
wherein said copolymer has a randomness of at least 0.5.

2. A process according to claim 1 wherein the organic moiety L3 is a straight or branched aliphatic chain, or cyclic or aromatic moiety, that contains 2 to 30 carbon atoms, optionally containing 1 to 10 heteroatoms selected from N, O, F, Cl and Br.

3. A process according to claim 1 wherein the organic moiety L3 has a chain length between Y and Y' of at least 3 atoms.

4. A process according to claim 1 wherein the trivalent metal M is selected from the group consisting of aluminium, yttrium, and scandium.

5. A process according to claim 1 wherein the linking moieties L1, L2 and L3 together with X, X', Y and Y' form a tetradentate ligand bound to metal M.

6. A process according to claim 1 wherein Z is selected from the group consisting of an alkoxide (—OR, wherein R is an optionally-substituted alkyl or an optionally-substituted aryl), a carboxylate (—OC(=O)R, wherein R is an optionally-substituted alkyl or an optionally substituted aryl), an amine (—NR₂, wherein R is an optionally-substituted alkyl or an optionally substituted aryl), a thiolate (—SR, wherein R is an optionally-substituted alkyl or an optionally-substituted aryl), or borohydride ($BH_{4-x}R_x$, wherein x is an integer of from 1-3 and R is an optionally-substituted alkyl or an optionally-substituted aryl).

7. A process according to claim 1 wherein the catalyst is a compound of formula II formula II

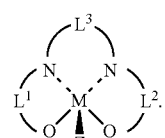

8. A process according to claim 1 wherein the catalyst is a compound of formula III formula III

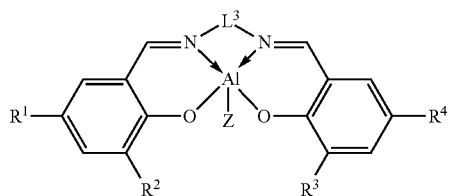

wherein
R¹, R², R³ and R⁴ are independently selected from the group consisting of hydrogen, $C_{1-10}$ alkyl, silyl, $C_{1-6}$ alkoxy, $C_{3-8}$ cycloalkyl, $C_{3-8}$ cycloalkoxy, aryl, aryloxy, $C_{1-10}$ amine, $C_{1-10}$ nitro, $C_{1-10}$ cyano, a halide (F, Cl, Br, I), and a 5- or 6 membered heterocycle containing from 1 to 4 heteroatoms selected from oxygen, sulfur, nitrogen, and phosphorous.

9. A process according to claim 8 wherein R¹, R², R³ and R⁴ are independently selected from hydrogen, methyl, ethyl, propyl, isopropyl, n-butyl, i-butyl, s-butyl, t-butyl, n-pentyl, i-pentyl, neopentyl, n-hexyl, 2,2-dimethylbutane, 2-methylpentane, 3-methylpentane, 2,3-dimethylbutane, cyclohexane, adamantyl, methoxide, ethoxide, n-butoxide, sec-butoxide, t-butoxide, aryloxide and halides.

10. A process according to claim 1 wherein the first cyclic ester is a lactone and/or the second cyclic ester is a lactone.

11. A process according to claim 1 wherein the first cyclic ester has a first ring size of from 4-8 atoms, or wherein the second cyclic ester has a second ring size of from 12-24 atoms, or wherein both the first cyclic ester has a first ring size of from 4-8 atoms and the second cyclic ester has a second ring size of from 12-24 atoms.

12. A process according to claim 1 wherein the copolymerisation is carried out in one step.

13. A copolymer of a first cyclic ester having a first ring size from 4 to 11 atoms and a second cyclic ester having a second ring size from 12 to 40 atoms wherein said copolymer has a randomness of at least 0.5 and a number average molecular weight of at least 15000 g/mol determined by size exclusion chromatography in 1,2,4 trichlorobenzene at 160° C. using polyethylene standards.

14. The copolymer of claim 13 wherein the copolymer is obtained by a process for preparing a copolymer comprising providing a first cyclic ester having a first ring size from 4 to 11 atoms and a second cyclic ester having a second ring size from 12 to 40 atoms and subjecting the first and second cyclic esters to ring-opening copolymerization using as catalyst a compound of formula I formula I

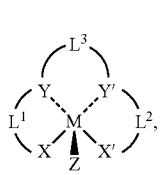

wherein
M is a trivalent metal selected from the group consisting of aluminium, titanium, vanadium, chromium, manganese, cobalt, yttrium, scandium, and lanthanides;
X and X' are both a heteroatom and may be the same or different;
Y and Y' are independently selected from the group consisting of O, N, S and P;
Z is selected from the group consisting of hydrogen, borohydrides, aluminium hydrides, carbyls, silyls, hydroxides, alkoxides, aryloxides, carboxylates, thiocarboxylates, dithiocarboxylates, carbonates, carbamates, guanidates, amides, thiolates, phosphides, hydrazonate, imide, cyanide, cyanate, thiocyanate, azide, nitro, siloxides and halides;
L1 is an organic moiety linking X and Y;
L2 is an organic moiety linking X' and Y';
L1 and L2 are the same or different;
L3 is an organic moiety linking Y and Y' and has a chain length between Y and Y' of at least 2 atoms; and
wherein said copolymer has a randomness of at least 0.5 and a number average molecular weight of at least 15000 g/mol determined by size exclusion chromatography in 1,2,4 trichlorobenzene at 160° C. using polyethylene standards.

15. A polymer composition comprising the copolymer of claim 13 and an additional polymer selected from the group consisting of polyolefin, polyester, polycarbonate, and polyamide.

16. A process for preparing a copolymer comprising providing a first cyclic lactone having a first ring size from 4 to 8 atoms and a second cyclic lactone having a second ring size from 12 to 24 atoms and subjecting the first and second cyclic esters to ring-opening copolymerization using as catalyst a compound of formula II formula II

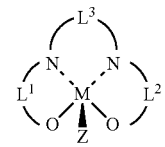

wherein
M is a trivalent metal selected from the group consisting of aluminium, yttrium, and scandium;
Z is selected from the group consisting of hydrogen, borohydrides, aluminium hydrides, carbyls, silyls, hydroxides, alkoxides, aryloxides, carboxylates, thiocarboxylates, dithiocarboxylates, carbonates, carbamates, guanidates, amides, thiolates, phosphides, hydrazonate, imide, cyanide, cyanate, thiocyanate, azide, nitro, siloxides and halides;
L1 and L2 are the same or different organic linking moieties; and
L3 is an organic linking moiety having a chain length between each nitrogen of 3 to 5 atoms, wherein the linking moieties L1, L2 and L3 together with each nitrogen and oxygen Y' form a tetradentate ligand bound to metal M; and
wherein said copolymer has a randomness of at least 0.5 and a number average molecular weight of at least 15000 g/mol determined by size exclusion chromatography in 1,2,4 trichlorobenzene at 160° C. using polyethylene standards.

17. A process according to claim 16, wherein the tetradentate ligand is a salen.

18. A process according to claim 16 wherein Z is selected from the group consisting of an alkoxide (—OR, wherein R is an optionally-substituted alkyl or an optionally-substituted aryl), a carboxylate (—OC(=O)R, wherein R is an optionally-substituted alkyl or an optionally substituted aryl), an amine (—NR$_2$, wherein R is an optionally-substituted alkyl or an optionally substituted aryl), a thiolate (—SR, wherein R is an optionally-substituted alkyl or an optionally-substituted aryl), or borohydride (BH$_{4-x}$R$_x$, wherein x is an integer of from 1-3 and R is an optionally-substituted alkyl or an optionally substituted aryl).

19. A process for preparing a copolymer comprising providing a first cyclic lactone having a first ring size from 4 to 8 atoms and a second cyclic lactone having a second ring size from 12 to 24 atoms and subjecting the first and second cyclic esters to ring-opening copolymerization using as catalyst a compound of formula III

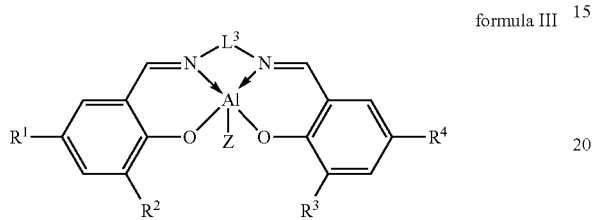

formula III wherein

Z is selected from the group consisting of hydrogen, borohydrides, aluminium hydrides, carbyls, silyls, hydroxides, alkoxides, aryloxides, carboxylates, thiocarboxylates, dithiocarboxylates, carbonates, carbamates, guanidates, amides, thiolates, phosphides, hydrazonate, imide, cyanide, cyanate, thiocyanate, azide, nitro, siloxides and halides;

L3 is an organic linking moiety linking having a chain length between each nitrogen of 3 to 5 atoms; and R$^1$, R$^2$, R$^3$ and R$^4$ are independently selected from the group consisting of hydrogen, C$_{1-10}$ alkyl, silyl, C$_{1-6}$ alkoxy, C$_{3-8}$ cycloalkyl, C$_{3-8}$ cycloalkoxy, aryl, aryloxy, C$_{1-10}$ amine, C$_{1-10}$ nitro, C$_{1-10}$ cyano, a halide (F, Cl, Br, I), and a 5- or 6- membered heterocycle containing from 1 to 4 heteroatoms selected from oxygen, sulfur, nitrogen, and phosphorous; and wherein said copolymer has a randomness of at least 0.5 and a number average molecular weight of at least 15000 g/mol determined by size exclusion chromatography in 1,2,4 trichlorobenzene at 160° C. using polyethylene standards.

20. A process according to claim 19 wherein

Z is selected from the group consisting of an alkoxide (—OR, wherein R is an optionally-substituted alkyl or an optionally-substituted aryl), a carboxylate (—OC(=O)R, wherein R is an optionally-substituted alkyl or an optionally substituted aryl), an amine (—NR$_2$, wherein R is an optionally-substituted alkyl or an optionally substituted aryl), a thiolate (—SR, wherein R is an optionally-substituted alkyl or an optionally-substituted aryl), or borohydride (BH$_{4-x}$R$_x$, wherein x is an integer of from 1-3 and R is an optionally-substituted alkyl or an optionally substituted aryl); and R$^1$, R$^2$, R$^3$ and R$^4$ are independently selected from hydrogen, methyl, ethyl, propyl, isopropyl, n-butyl, i-butyl, s-butyl, t-butyl, n-pentyl, i-pentyl, neopentyl, n-hexyl, 2,2-dimethylbutane, 2-methylpentane, 3-methylpentane, 2,3-dimethylbutane, cyclohexane, adamantyl, methoxide, ethoxide, n-butoxide, sec-butoxide, t-butoxide, aryloxide and halides.

* * * * *